US009428109B2

(12) United States Patent
Binnicker

(10) Patent No.: US 9,428,109 B2
(45) Date of Patent: Aug. 30, 2016

(54) TEMPERATURE-SENSITIVE VEHICLE OCCUPANCY DETECTION AND ALERT SYSTEM

(71) Applicant: Gary Binnicker, Decatur, IL (US)

(72) Inventor: Gary Binnicker, Decatur, IL (US)

( * ) Notice: Subject to any disclaimer, the term of this patent is extended or adjusted under 35 U.S.C. 154(b) by 3 days.

(21) Appl. No.: 14/525,190

(22) Filed: Oct. 27, 2014

(65) Prior Publication Data
US 2015/0137962 A1 May 21, 2015

Related U.S. Application Data

(60) Provisional application No. 61/895,462, filed on Oct. 25, 2013.

(51) Int. Cl.
| | |
|---|---|
| *B60Q 1/00* | (2006.01) |
| *B60Q 9/00* | (2006.01) |
| *B60N 2/00* | (2006.01) |
| *B60N 2/26* | (2006.01) |
| *G08B 21/22* | (2006.01) |

(52) U.S. Cl.
CPC ............ *B60Q 9/00* (2013.01); *B60N 2/002* (2013.01); *B60N 2/26* (2013.01); *G08B 21/22* (2013.01)

(58) Field of Classification Search
CPC .... B60N 2/002; B60N 2/26; G08B 13/1427; G08B 21/0269; G08B 21/24; G08B 25/016; B60Q 9/00

USPC ............... 340/457, 573.1, 573.4, 539.13
See application file for complete search history.

(56) References Cited

U.S. PATENT DOCUMENTS

| | | | |
|---|---|---|---|
| 6,922,147 B1 * | 7/2005 | Viksnins | B60N 2/002 340/457 |
| 8,058,983 B1 * | 11/2011 | Davisson | G08B 21/0205 340/457 |
| 2013/0049955 A1 * | 2/2013 | Hoover | B60N 2/28 340/539.11 |
| 2013/0109342 A1 * | 5/2013 | Welch | B60N 2/002 340/438 |

* cited by examiner

*Primary Examiner* — Thomas Mullen
(74) *Attorney, Agent, or Firm* — Daniel Boudwin; Global Intellectual Property Agency

(57) ABSTRACT

A temperature-sensitive vehicle occupancy detection and alert system. The system alerts users when a young child is left unattended in a vehicle in order to prevent the young child from being exposed to dangerously high or low temperatures within the interior of the vehicle. The system utilizes sensor data captured by a plurality of different sensors, including at least one occupancy sensor, at least one temperature sensor, and at least one distance sensor. The system applies logic to the captured sensor data to determine whether to alert a user as to the fact that an occupant has been left unattended and to control various functions of the automobile that would allow individuals external to the vehicle to rescue the occupant from the dangerous conditions or provide relief to the child from the conditions, including by unlocking the vehicle's doors, lowering the vehicle's windows, and/or activating the vehicle's temperature control system.

17 Claims, 4 Drawing Sheets

TEMPERATURE-SENSITIVE VEHICLE OCCUPANCY DETECTION AND ALERT SYSTEM

CROSS REFERENCE TO RELATED APPLICATION

This application claims the benefit of U.S. Provisional Application No. 61/895,462 filed on Oct. 25, 2013. The above identified patent application is herein incorporated by reference in its entirety to provide continuity of disclosure.

BACKGROUND OF THE INVENTION

1. Field of the Invention

The present invention relates to car alert systems. More specifically, the present invention is related to systems that are adapted to alert individuals when they have left an occupant, such as a child, or an item in their car unintentionally. Even more specifically, the present invention is related to systems that are adapted to alert individuals when they have left an occupant unattended in an automobile and additionally that are adapted to take corrective measures to protect the occupant from inhospitable conditions in the event that the individual to which the alerts are directed nonetheless fails to retrieve the unattended occupant.

Even normally attentive parents or guardians may forget a young child and leave him or her in a car unattended for a substantial length of time when busy. This can be very dangerous if the weather is either excessively hot or cold, because the temperature within the automobile can increase or decrease precipitously. Hyperthermia, i.e. heatstroke, kills dozens of children in the United States each year, which is especially tragic because it would be so simple for these deaths to be preventable. Children who are asleep, are too young to speak, or are unable to open doors are especially susceptible to the dangers of being left unattended in an automobile. Therefore, there is a need in the prior art for a system that provides warnings to users when an occupant has been left unattended in an automobile and that is further adapted to take corrective action to either allow surrounding individuals to rescue the occupant, allow the occupant to leave the automobile easily, or to raise or lower the internal temperature of the vehicle as appropriate to counteract the dangerous conditions to which the occupant is subjected if the individual to which the alerts are provided fails to rescue the occupant.

2. Description of the Prior Art

Devices have been disclosed in the prior art that relate to vehicle occupancy notification systems. These include devices that have been patented and published in patent application publications. These devices generally relate to integral vehicle systems that comprise integral detection sensors. The following is a list of devices deemed most relevant to the present disclosure, which are herein described for the purposes of highlighting and differentiating the unique aspects of the present invention, and further highlighting the drawbacks existing in the prior art.

The prior art systems generally comprise integral detection sensors that are adapted to wirelessly transmit warnings or alerts to key fobs or other such devices, which are carried by the individual. However, these systems are not adapted to activate both a vehicle-based warning system and a wireless device-based warning system. Activating both systems ensures that both the individual carrying the wireless device, which comprises a fob, is notified of the fact that the occupant has been left unattended and other surrounding individuals are also notified as such so that they can assist the child as needed. Furthermore, the prior art systems are not adapted to automatically take corrective measures by activating functions of the vehicle to alleviate the dangerous conditions in which the occupant has been placed, as necessary.

The present invention substantially diverges in design elements from the prior art and consequently it is clear that there is a need in the art for an improvement to existing occupancy notification systems. In this regard the instant invention substantially fulfills these needs.

SUMMARY OF THE INVENTION

In view of the foregoing disadvantages inherent in the known types of occupancy detection and alert systems now present in the prior art, the present invention provides a new temperature-sensitive occupancy detection and alert system wherein the same can be utilized for alerting users when they have left an occupant, such as a young child or a pet, unattended in their vehicle and for helping to protect the child from dangerously high or low temperatures within the vehicle.

It is therefore an object of the present invention to provide a new and improved occupancy detection and alert system that has all of the advantages of the prior art and none of the disadvantages.

It is another object of the present invention to provide an occupancy detection and alert system that is adapted to provide both vehicle-based and wireless-device based alerts to individuals when an occupant has been left unattended within an automobile.

Another object of the present invention is to provide an occupancy detection and alert system that activates various functions of the vehicle in order to take corrective measures when an individual has been left unattended within the automobile and the ambient temperature within the automobile falls outside a pre-defined range.

Yet another object of the present invention is to provide an occupancy detection and alert system that is customizable by the users.

Yet another object of the present invention is to provide an occupancy detection and alert system that comprises a logic adapted to monitor a variety of sensors to determine whether to activate the alarm units and/or whether to activate various additional functions of the automobile.

Still yet another object of the present invention is to provide an occupancy detection and alert system that comprises one or more occupancy sensors, one or more temperature sensors, one or more distance sensors, a wireless transceiver, and a logic that is in electronic communication therebetween.

Still yet another object of the present invention is to provide an occupancy detection and alert system that comprises a wireless device, such as a fob, that comprises an alert unit and a wireless transceiver, which is in wireless communication with a wireless transceiver integral to the vehicle and in electronic communication with the logic.

And yet still another object of the present invention is to provide an occupancy detection and alert system that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
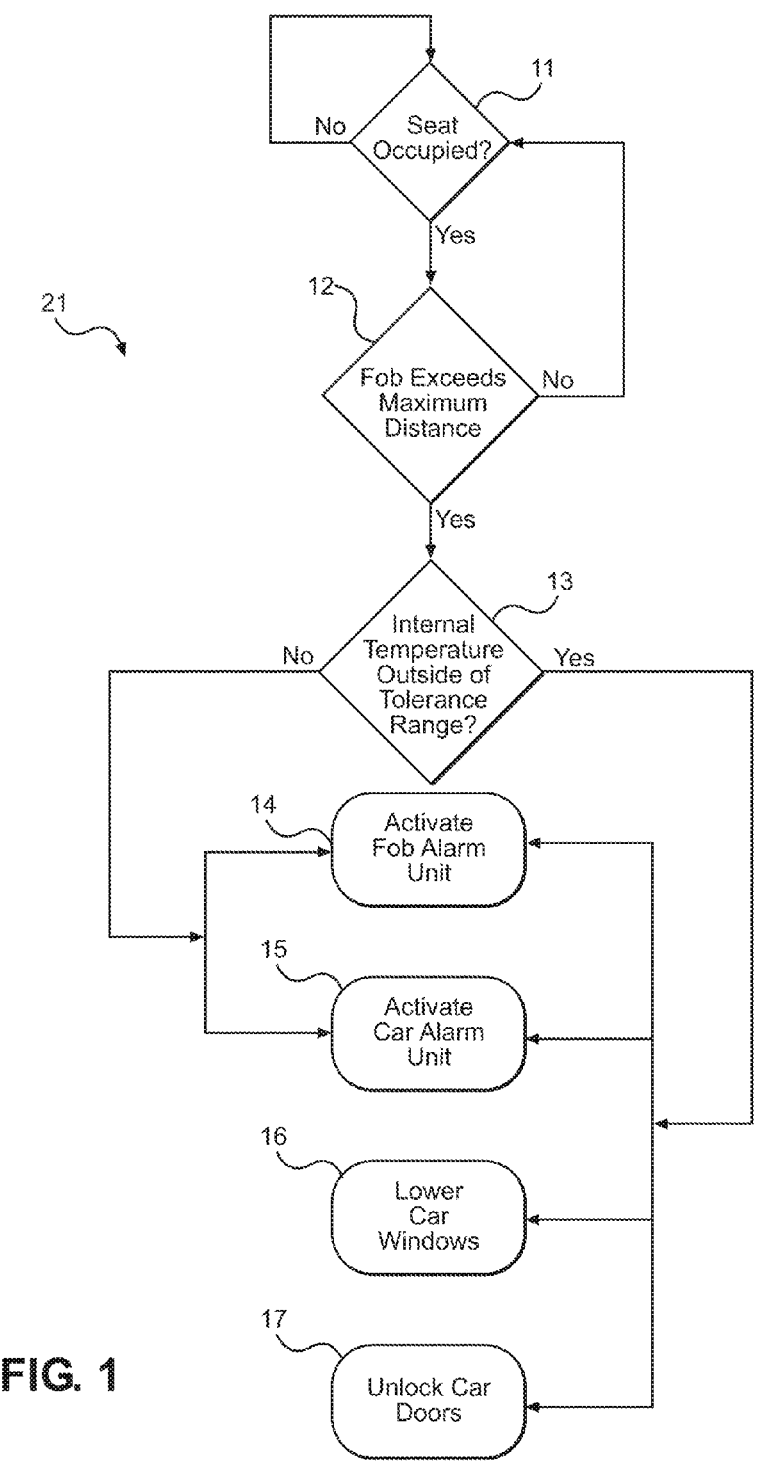
FIG. 1 shows a flowchart diagram of the logic system of the present invention.

Reference is made herein to the attached drawings. Like reference numerals are used throughout the drawings to depict like or similar elements of the automobile occupancy alarm. For the purposes of presenting a brief and clear description of the present invention, the preferred embodiment will be discussed as used for warning users as to the presence of a young child that is inadvertently left unattended in the users' cars. The figures are intended for representative purposes only and should not be considered to be limiting in any respect.

As used herein, "logic" refers to (i) logic implemented as computer instructions and/or data within one or more computer processes and/or (ii) logic implemented in electronic circuitry. As used herein, "computer-readable medium" excludes any transitory signals, but includes any non-transitory data storage circuitry, e.g., buffers, cache, and queues, within transceivers of transitory signals.

Referring now to FIG. 1, there is shown a flowchart diagram of the logic system of the present invention. The present invention is adapted to provide alerts to users when a young child is left unattended in an automobile in order to prevent the young child from being exposed to dangerously high or low temperatures within the interior of the vehicle. However, one having ordinary skill in the art would recognize that the present system is equally adapted to provide warnings to users when other types of individuals or pets are left unattended in a vehicle. The present temperature-sensitive occupancy detection and alert system utilizes sensor data captured by a plurality of different sensors, including at least one occupancy sensor, at least one temperature sensor, and at least one distance sensor. The present invention applies logic to the captured sensor data to determine when to alert a user as to the fact that a child is left unattended within the automobile and to control various functions of the automobile, including at least unlocking the vehicle's doors and lowering the vehicle's windows. The present system is integrated directly into the vehicle itself and is adapted to be customizable by the users.

The present invention comprises at least one occupancy sensor, at least one distance sensor, at least one temperature sensor, a logic stored on a computer-readable medium, a first wireless transceiver, and a fob having a second wireless transceiver. The first and second wireless transceivers are adapted to send and receive signals therebetween, allowing individuals to receive warnings from the present system and allowing the present system to calculate the distance between the fob and the system, which is integral to the automobile. The logic of the present invention comprises at least three separate decision points that access and utilize sensor data. At the first step 11, the present invention continuously detects whether one of the vehicle's seats is occupied via at least one occupancy sensor. The occupancy sensors comprise passive infrared motion detectors, ultrasonic motion detectors, video camera motion detectors, pressure sensors, and any other such device capable of detecting the presence of an individual within an automobile.

In one embodiment, the occupancy sensors and the other components of the present system are deactivated until the vehicle's engine is turned off. As the present invention is integrated directly into the various computer systems of the vehicle, the present system is able to access the state of the vehicle, i.e. whether it is on or off, via either (i) successively passively querying the vehicle's engine computer or other such computer components of the vehicle or (ii) receiving an activation signal from one of the vehicle's computers when the engine is turned off. It is contemplated that the computer systems of the vehicle generally comprise at least one processor, at least one memory, at least one storage, and other components necessary to operate computer systems. In either versions of this embodiment of the present invention, the present system only notifies users as to a young child being left unattended in a car that is turned off.

In one embodiment of the present invention, the occupancy sensors are arranged such that only the backseats are monitored. The particular position and arrangement of the occupancy sensors is dependent upon the type of sensor utilized for the occupancy sensors. For example, in embodiments of the present invention wherein the occupancy sensors comprise pressure sensors, the pressure sensors are only disposed within or on the backseats. In another exemplary embodiment of the present invention wherein the occupancy sensors comprise motion detectors, the motion detectors are positioned within the interior of the automobile and oriented such that only the backseats are monitored for movement. Generally speaking, young children are only placed in the back seat due to safety concerns with the passenger side front air bag. Therefore, these embodiments of the present invention restrict the monitoring activities of the system to the locations in which young children would most generally be located.

If the present system detects that the vehicle is occupied, then the logic moves to the second step 12 and determines the distance between the present system and the fob via at least one distance sensor. The fob is intended to be carried by the user and the present system, including the distance sensor, is integrated into to the vehicle, thereby allowing the present system to determine the distance between the user and the automobile. The present system is adapted to provide alerts to individuals who move beyond a predetermined distance from the vehicle when the vehicle is occupied in order to remind the users that the vehicle is occupied and prevent the users from leaving young children unattended in the vehicle. In an exemplary embodiment of the present invention, the maximum distance tolerance from the vehicle to which the user may proceed without activating the warnings is fifteen yards. If the present system evaluates both steps 11, 12 as true, then an emergency mode is triggered.

The distance sensor comprises one or more ultrasonic proximity sensors, infrared proximity sensors, and other such sensors known in the prior art. These sensors generally function by monitoring changes between the emitted signal and the returned signal from the fob, thereby allowing the present system to calculate the change in the distance between the fob and the integral vehicle system as a function of the change of one or more of the signal's characteristics. In an alternative embodiment of the present invention, as shown in FIG. 3B the distance between the fob and the integral vehicle system is determined via a Global Positioning System (GPS). In this embodiment of the present invention, the portion of the present system integral to the vehicle comprises a GPS system 71, or accesses the vehicle's internal GPS system, and the fob contains a separate GPS system 72. When the second step 13 is activated, the integral vehicle system and the fob both separately determine their respective coordinates and transmit those coordinates to the logic 21 of the present system. The logic 21 is then adapted to calculate the distance between those coordinates and thereby determine the distance between the fob, which is presumably carried by the individual, and the vehicle.

If the logic 21 determines that the fob has moved beyond the maximum distance tolerance, the logic 21 then proceeds to the third step 13 and accesses the temperature sensors to determine if the ambient temperature within the vehicle is within a pre-programmed temperature range. The temperature range is defined by high and low bounds of a maximum temperature tolerance and a minimum temperature tolerance, respectively. If the fob exceeds the maximum distance tolerance from the vehicle and the ambient vehicle interior temperature is within the temperature tolerance range, then emergency mode is triggered and the logic 21 activates both the fob alarm unit 14 and the vehicle alarm unit 15. In one embodiment of the present invention, the vehicle alarm unit comprises the vehicle's headlights, horn, or integral theft alarm system. In this embodiment, the present system is connected to or integrated into the aforementioned systems that are integral to the vehicle. In an alternative embodiment of the present invention, the vehicle alarm unit comprises a separate unit, which in turn comprises audible alerts, visual alerts, or any combination thereof.

If the fob exceeds the maximum distance tolerance from the vehicle and the ambient vehicle interior temperature is outside the temperature tolerance range, then the logic 21 activates a supplemental emergency mode that triggers various functions of the vehicle designed to save the occupant left therein, in addition to activating the emergency mode as described above, i.e. in addition to activating the fob alarm unit 14 and the vehicle alarm unit 15. If the ambient vehicle temperature is above the maximum temperature tolerance, then the logic 21 additionally at least lowers the vehicle's windows 16 and unlocks the vehicle's doors 17 in order to reduce the temperature therein and allow individuals outside of the vehicle to access the interior of the vehicle in order to rescue the young children therein who may be overheating. In an exemplary embodiment of the present invention, the maximum temperature tolerance is 120 degrees. In other embodiments of the present invention, the user is able to program the maximum temperature tolerance. If the ambient vehicle temperature is below the minimum temperature tolerance, then the logic 21 additionally at least activates the vehicle's internal heating system. If the vehicle's engine needs to be turned on for the heating system to generate heat, then the present system additionally turns the vehicle's engine on. The upper and lower bounds of the temperature tolerance range can be adjusted or disabled as desired by the user via either controls disposed within the vehicle or controls disposed on the fob in order to control the functionality of the present system.

In the exemplary embodiment of the present invention, the logic 21 activates the fob alarm unit via an activation signal relayed wirelessly by the first wireless transceiver to the second wireless transceiver disposed within the fob. The wireless signal relayed between the first and second wireless transceivers comprises Bluetooth, ZigBee, or any other such wireless communication means. The fob alarm comprises audible alerts, visual alerts, or any combination thereof. The audio alerts comprise pre-recorded warning messages, alarms, sirens, or any other such sounds. The visual alerts comprise flashing lights, text warnings, or any other such visual indicia. Alternative embodiments of the present invention further comprises additional types of alerts, such as vibration alerts and the like. The present invention further comprises a means for selecting the type of alert or a combination of alerts emitted by the fob.

Figure 2:
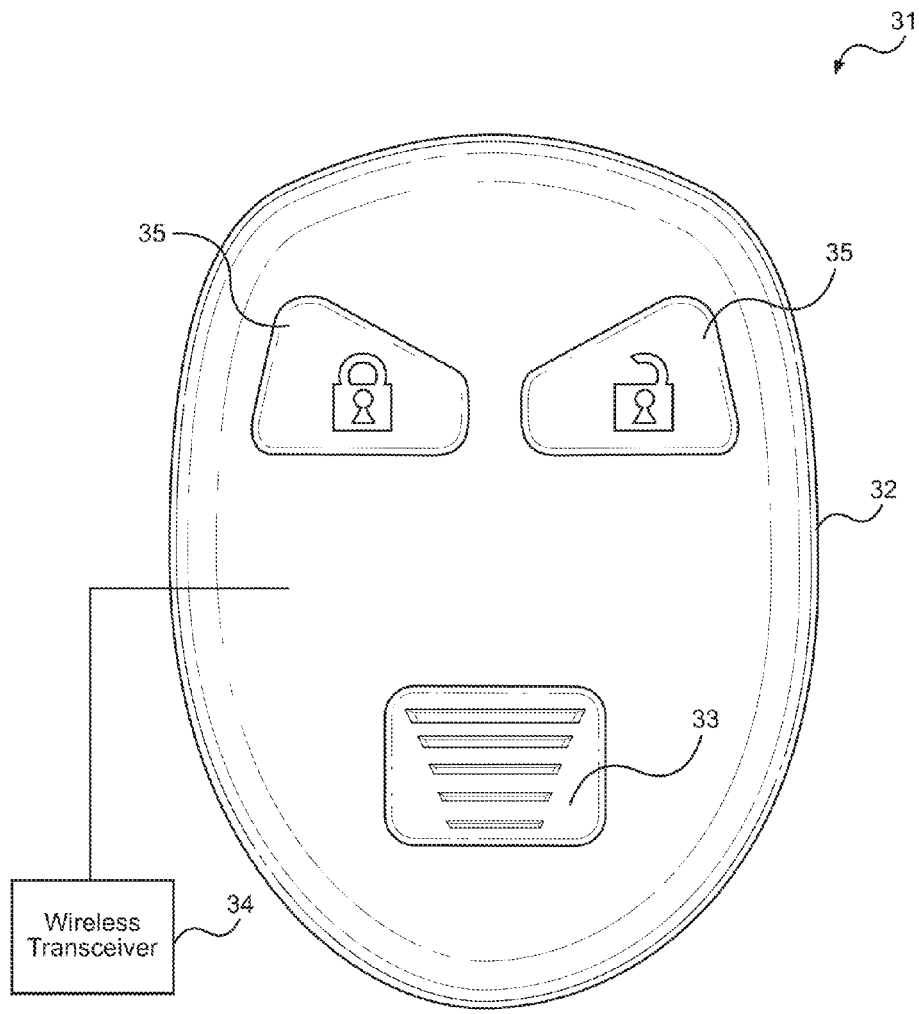
FIG. 2 shows a diagram of an embodiment of the fob portion of the present invention.

Referring now to FIG. 2, there is shown a diagram of an embodiment of the fob portion of the present invention. The fob 31 component of the present system is adapted to be carried by the user so that the user is provided with a remote, wireless alert if he or she leaves a child unattended in a vehicle, i.e. if he or she moves beyond a predetermined distance from the vehicle when the vehicle is occupied. It is adapted to be carried by the user and comprises a keychain or other such attachment device so that it can be easily carried on the individual's person.

An exemplary embodiment of the fob 31 comprises a housing 32, a speaker 33, a second wireless transceiver 34, and a plurality of buttons 35. The speaker 33 is adapted to emit audio alerts in response to an activation signal received by the second wireless transceiver 34 from the first wireless transceiver, which is integrally disposed within an automobile. In alternative embodiments, the fob 31 further comprises at least one light or other visual alert. The buttons 35 disposed on the housing 32 provide users with a means to control a variety of the present system's functions, including deactivating the fob alarm, deactivating the vehicle alarm, incrementing or decrementing the maximum distance tolerance, incrementing or decrementing the maximum temperature tolerance, and selecting between multiple different types of alerts or combinations thereof.

Figure 3A:
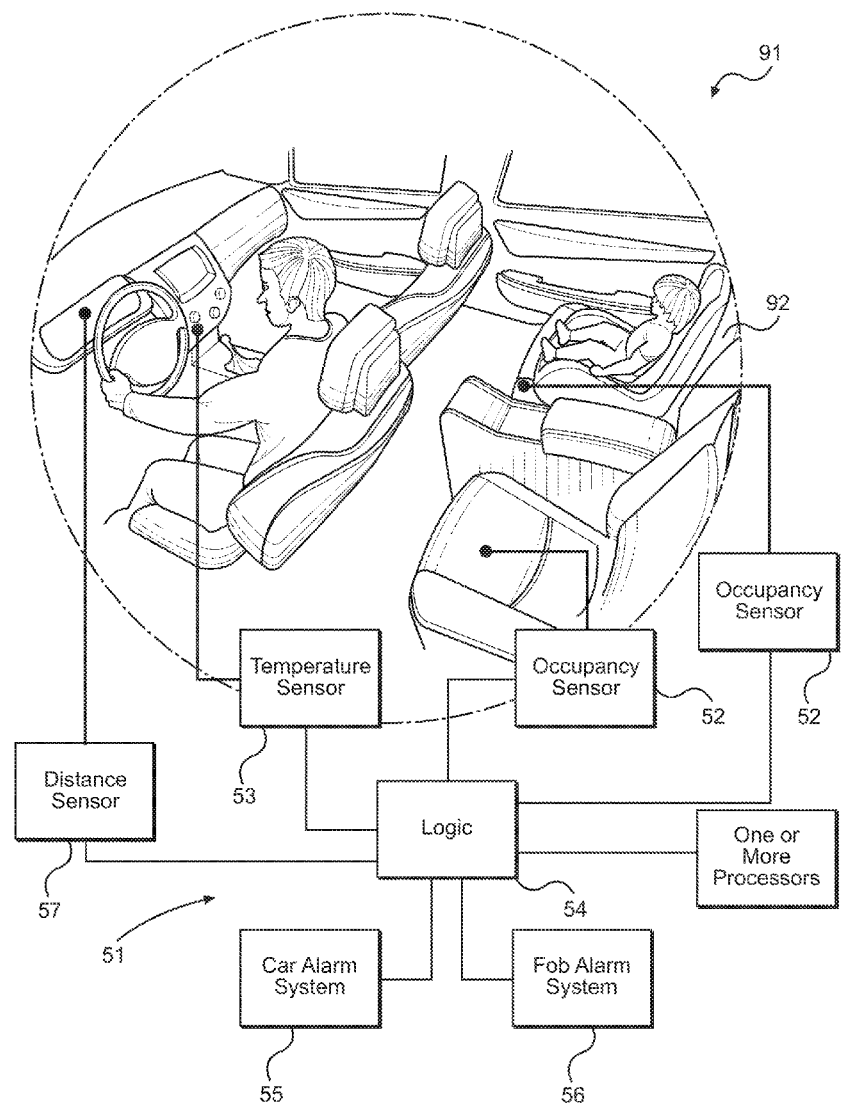
FIG. 3A shows a diagram of the interior of an automobile and the systems contained therein.
Figure 3B:
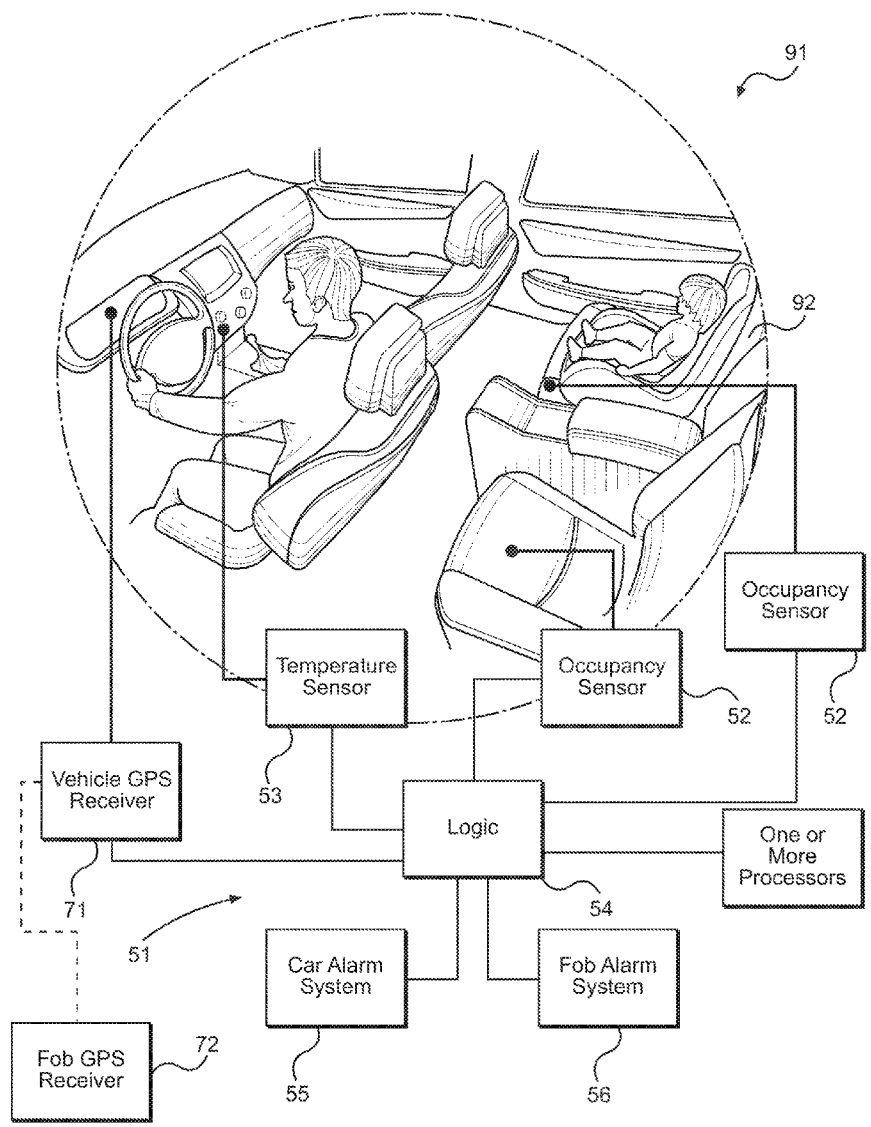
FIG. 3B shows a diagram of the interior of an automobile and an alternative embodiment of the systems contained therein.

Referring now to FIG. 3, there is shown a diagram of the interior of an automobile and the systems contained therein. The present vehicle system 51 comprises at least one occupancy sensor 52, at least one temperature sensor 53, at least one distance sensor 57, and a logic 54 electronically interconnected therewith. The present sensors 52, 53, 57 are integrally disposed throughout the interior of the automobile 91. However, no claim is made as to the precise number or arrangement of said sensors 52, 53, 57. The occupancy sensors comprise passive infrared motion detectors, ultrasonic motion detectors, video camera motion detectors, pressure sensors, and any other such device capable of detecting the presence of an individual within a vehicle. In an exemplary embodiment of the present invention, the occupancy sensors 52 comprise pressure sensors disposed within the backseats 92 of the vehicle. The exemplary pressure-sensitive occupancy sensors 52 are adapted to detect changes in force exerted upon the seats 92. If a young child is sitting on one of the seats 92, then the occupancy sensors 52 detect the weight of the child impinging on the seat 92 and transmit a signal to the logic 54 that the vehicle is presently occupied.

The logic 54 comprises a monitoring loop that successively accesses the various sensors 52, 53, 57 to determine whether the automobile alarm system 55 and the fob alarm system 56 need to be activated in order to alert the user that he or she has left a child unattended in the automobile 91. In one embodiment of the present invention, the present system 51 is deactivated until the automobile engine is turned off. In other embodiments, the present system continuously and passively monitors the automobile 91 regardless of whether the automobile engine is on or off. The logic 54 comprises computer-implemented instructions stored on a computer-readable medium integrated into the automobile's electronic systems.

The power source utilized by the present integral vehicle system comprises (i) a separate unit dedicated solely for use by the present system, (ii) the vehicle's integral power source, e.g. a car battery, with which the present system is in electrical communication, or (iii) a combination thereof. The power source provides the necessary electrical energy to power the various electronic components of the present system that are integral to the vehicle, including the distance sensors 57, the temperature sensors 53, the occupancy sensors 52, and the logic 54. The fob is separately powered by a rechargeable battery or other such power source as is commonly known in the art of portable wireless communications electronics.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An occupancy detection computer system for a vehicle, comprising:
   one or more processors;
   a non-transitory computer readable medium operatively connected to said one or more processors;
   logic stored in said non-transitory computer readable medium that, when executed by said one or more processors from the computer readable medium, causes said computer system to detect the presence of an occupant within a vehicle interior and trigger at least one alarm if said occupant is left unattended, by at least:
      monitoring for the presence of said occupant within said vehicle interior via at least one occupancy sensor;
      monitoring the distance between the vehicle and a fob via at least one distance sensor;
      monitoring the temperature within said vehicle interior via at least one temperature sensor;
      if said vehicle interior is occupied and said fob exceeds a maximum distance tolerance from the vehicle, triggering an emergency mode;
      if said emergency mode is triggered, activating a fob alarm unit and a vehicle alarm unit; and
      if said emergency mode is triggered and said vehicle interior falls outside a temperature tolerance range, activating a supplemental emergency mode.

2. The occupancy detection computer system of claim 1, wherein if said vehicle interior exceeds a maximum tolerance temperature, said supplemental emergency mode comprises unlocking at least one door of said vehicle.

3. The occupancy detection computer system of claim 1, wherein if said vehicle interior exceeds a maximum tolerance temperature, said supplemental emergency mode comprises lowering at least one window of said vehicle.

4. The occupancy detection computer system of claim 1, wherein if said vehicle interior exceeds a maximum tolerance temperature, said supplemental emergency mode comprises unlocking at least one door of said vehicle and lowering at least one window of said vehicle.

5. The occupancy detection computer system of claim 1, wherein if said vehicle interior falls below a minimum tolerance temperature, said supplemental emergency mode comprises activating a heating system of said vehicle.

6. The occupancy detection computer system of claim 1, wherein said occupancy sensor comprises one or more motion detectors.

7. The occupancy detection computer system of claim 1, wherein said occupancy sensor comprises one or more pressure sensors disposed within seats of said vehicle.

8. The occupancy detection computer system of claim 1, wherein said at least one distance sensor comprises an infrared proximity sensor.

9. The occupancy detection computer system of claim 1, wherein said at least one distance sensor comprises an ultrasonic proximity sensor.

10. The occupancy detection computer system of claim 1, wherein:
    said distance sensor comprises a fob GPS receiver and a vehicle GPS receiver;
    each of said fob GPS receiver and said vehicle GPS receiver adapted to receive GPS satellite signals; and
    said logic, when executed by the one or more processors, causes the computer system to calculate the distance between said fob GPS receiver and said vehicle GPS receiver.

11. The occupancy detection computer system of claim 1, further comprising a power source.

12. The occupancy detection computer system of claim 11, wherein said power source comprises a battery of said vehicle.

13. A computer-implemented method comprising the steps of:
    monitoring for the presence of an occupant within a vehicle interior of a vehicle via at least one occupancy sensor;
    monitoring the distance between the vehicle and a fob via at least one distance sensor;
    monitoring the temperature within said vehicle interior via at least one temperature sensor;
    if said vehicle interior is occupied and said fob exceeds a maximum distance tolerance from the vehicle, triggering an emergency mode;
    if said emergency mode is triggered, activating a fob alarm unit and a vehicle alarm unit;
    if said emergency mode is triggered and said vehicle interior falls outside a temperature tolerance range, activating a supplemental emergency mode.

14. The computer-implemented method of claim 13, wherein if said vehicle interior exceeds a maximum tolerance temperature, said supplemental emergency mode comprises unlocking at least one door of said vehicle.

15. The computer-implemented method of claim 13, wherein if said vehicle interior exceeds a maximum tolerance temperature, said supplemental emergency mode comprises lowering at least one window of said vehicle.

16. The computer-implemented method of claim 13, wherein if said vehicle interior exceeds a maximum tolerance temperature, said supplemental emergency mode comprises unlocking at least one door of said vehicle and lowering at least one window of said vehicle.

17. The computer-implemented method of claim 13, wherein if said vehicle interior falls below a minimum tolerance temperature, said supplemental emergency mode comprises activating a heating system of said vehicle.

* * * * *